(12) United States Patent
Nakamura et al.

(10) Patent No.: US 8,253,398 B2
(45) Date of Patent: Aug. 28, 2012

(54) SEMICONDUCTOR DEVICE

(75) Inventors: Kazutoshi Nakamura, Kanagawa-ken (JP); Norio Yasuhara, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 468 days.

(21) Appl. No.: 12/500,015

(22) Filed: Jul. 9, 2009

(65) Prior Publication Data

US 2010/0013451 A1    Jan. 21, 2010

(30) Foreign Application Priority Data

Jul. 16, 2008  (JP) ................. 2008-184723

(51) Int. Cl.
*G05F 1/40* (2006.01)
*G05F 1/613* (2006.01)

(52) U.S. Cl. ................... 323/271; 323/225

(58) Field of Classification Search ............ 323/222, 323/223, 225, 268, 271, 272, 282, 285
See application file for complete search history.

(56) References Cited

U.S. PATENT DOCUMENTS

| 5,481,178 | A | 1/1996 | Wilcox et al. | |
| 7,026,795 | B2 * | 4/2006 | So | 323/222 |
| 7,148,663 | B2 * | 12/2006 | Shirokoshi et al. | 323/222 |
| 7,245,116 | B2 * | 7/2007 | Tateno et al. | 323/316 |
| 7,382,116 | B2 | 6/2008 | Endo et al. | |
| 7,486,055 | B2 * | 2/2009 | Yamashita | 323/222 |
| 7,994,769 | B2 * | 8/2011 | Ohtake et al. | 323/283 |

FOREIGN PATENT DOCUMENTS

| JP | 03-225952 A | 10/1991 |
| JP | 03-278570 A | 12/1991 |
| JP | 2002-076868 A | 3/2002 |
| JP | 2002-084742 A | 3/2002 |
| JP | 2002-203964 A | 7/2002 |
| JP | 2008-281744 | 9/2002 |
| JP | 2005-065447 A | 3/2005 |
| JP | 2005-295360 A | 10/2005 |
| JP | 2006-049341 A | 2/2006 |
| JP | 2006-333595 A | 12/2006 |
| JP | 2007-228711 A | 9/2007 |
| JP | 2007-329748 A | 12/2007 |
| JP | 2008-070680 A | 3/2008 |

OTHER PUBLICATIONS

Japanese Office Action sent Nov. 8, 2010 for Japanese Patent Application No. 2008-184723.
Japanese Office Action for Japanese Patent Application No. 2008-184723 Issued on Feb. 9, 2011.

* cited by examiner

*Primary Examiner* — Matthew Nguyen
(74) *Attorney, Agent, or Firm* — Turocy & Watson, LLP

(57) ABSTRACT

A semiconductor device includes: a high-side switching element having a first switching element connected between an input voltage line and an inductive load; and a low-side switching element having a second switching element and a third switching element that are connected in parallel between the inductive load and a reference voltage line. A surge current is discharged through the third switching element to the reference voltage line when a surge is applied to a terminal connected to the inductive load in the low-side switching element.

10 Claims, 8 Drawing Sheets

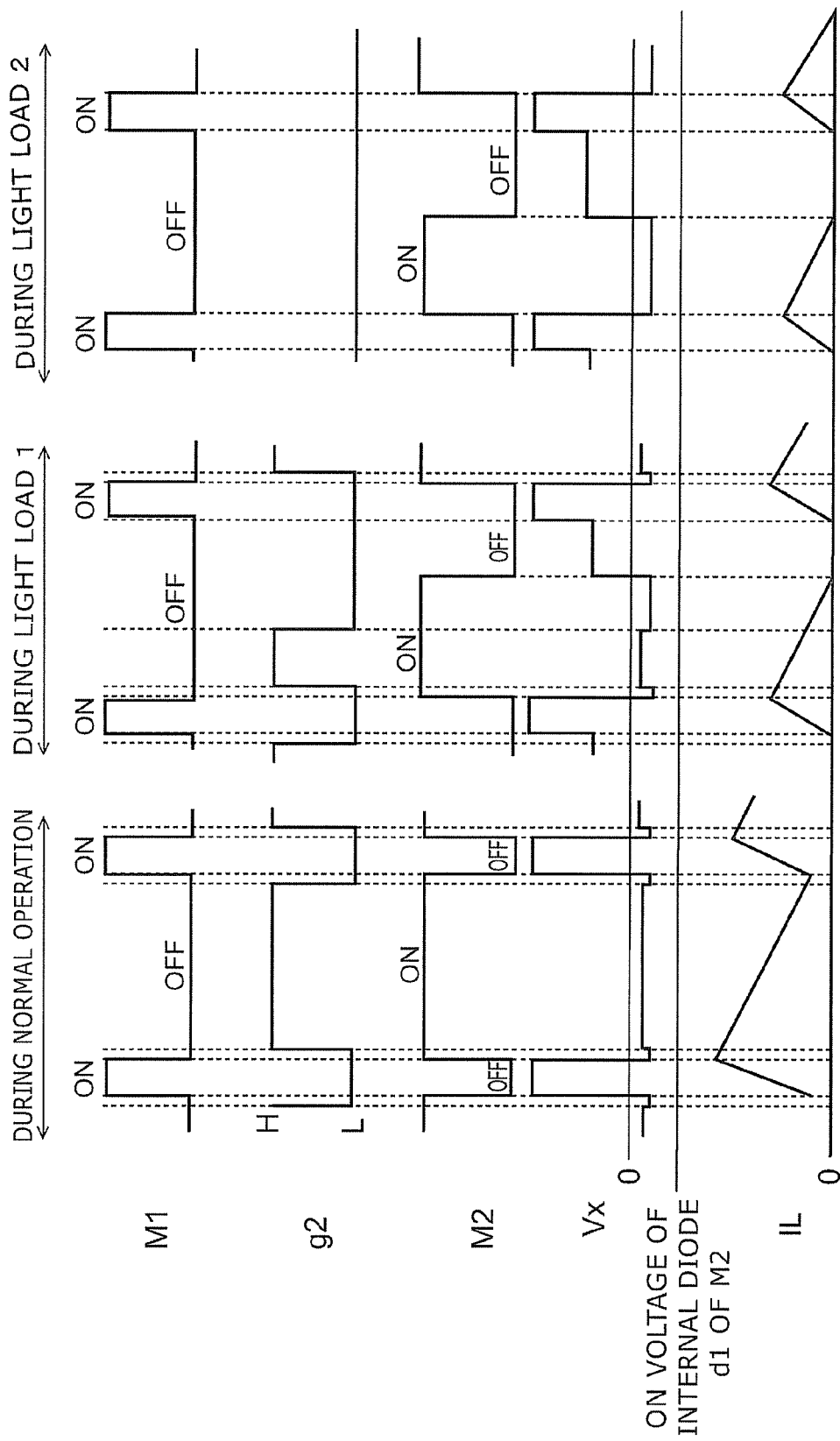

SEMICONDUCTOR DEVICE

CROSS-REFERENCE TO RELATED APPLICATIONS

This application is based upon and claims the benefits of priority from the prior Japanese Patent Application No. 2008-184723, filed on Jul. 16, 2008; the entire contents of which are incorporated herein by reference.

BACKGROUND OF THE INVENTION

This invention relates to a semiconductor device.

A power supply circuit such as a DC-DC converter comprises a high-side switching element connected between an input terminal and an inductor and a low-side switching element connected between the inductor and a ground. The high-side switching element and the low-side switching element are alternately switched ON/OFF. The DC-DC converter outputs an output voltage lower than an input voltage at a latter stage of an LC filter (for example, JP-A 2002-281744 (Kokai)).

The inductor is generally used to be an external add-on component with respect to a power IC in which switching elements and drivers and so forth are formed as integrated circuits. And in this case, a drain terminal of the low-side switching element is an external terminal of the power IC and can be exposed to ESD (Electro Static Discharge). The power IC is required not to be broken, even if the ESD surge applies into the external terminal.

SUMMARY OF THE INVENTION

According to an aspect of the invention, there is provided a semiconductor device including: a high-side switching element having a first switching element connected between an input voltage line and an inductive load; and a low-side switching element having a second switching element and a third switching element that are connected in parallel between the inductive load and a reference voltage line, a surge current being discharged through the third switching element to the reference voltage line when a surge is applied to a terminal connected to the inductive load in the low-side switching element.

According to another aspect of the invention, there is provided a semiconductor device including: a high-side switching element having a first switching element connected between an input voltage line and an inductive load; and a low-side switching element having a second switching element and a third switching element that are connected in parallel between the inductive load and a reference voltage line, 0<(a threshold voltage of the third switching element)< (an ON voltage of an internal diode of the second switching element) being satisfied, the third switching element becoming OFF when a potential of a connecting point between the first switching element and the second switching element becomes higher than—(the threshold voltage of the third switching element), and the third switching element becoming ON when the potential of the connecting point becomes lower than—(the threshold voltage of the third switching element).

According to another aspect of the invention, there is provided a semiconductor device including: a first switching element connected between an input voltage line and an inductive load; and a second switching element connected between the inductive load and a reference voltage line, 0<(a threshold voltage of the second switching element)<(an ON voltage of an internal diode of the second switching element) being satisfied, the second switching element becoming OFF when a potential of a connecting point between the first switching element and the second switching element becomes higher than—(the threshold voltage of the second switching element) if a gate voltage of the second switching element is a reference potential, and the second switching element becoming ON when the potential of the connecting point becomes lower than—(the threshold voltage of the second switching element) if the gate voltage of the second switching element is the reference potential.

BRIEF DESCRIPTION OF THE DRAWINGS

FIGS. 12A to 12C show waveforms of operation timings of the switching elements M1 and M2, gate voltages g2, potentials Vx, and the inductor current IL in the DC-DC converter shown in FIG. 11.

DETAILED DESCRIPTION OF THE INVENTION

Hereinafter, embodiments of the invention will be described with reference to the drawings.

A semiconductor device according to embodiments of the invention has a plurality of switching elements. The semiconductor device can be used for, for example, a DC-DC converter.

Figure 1:
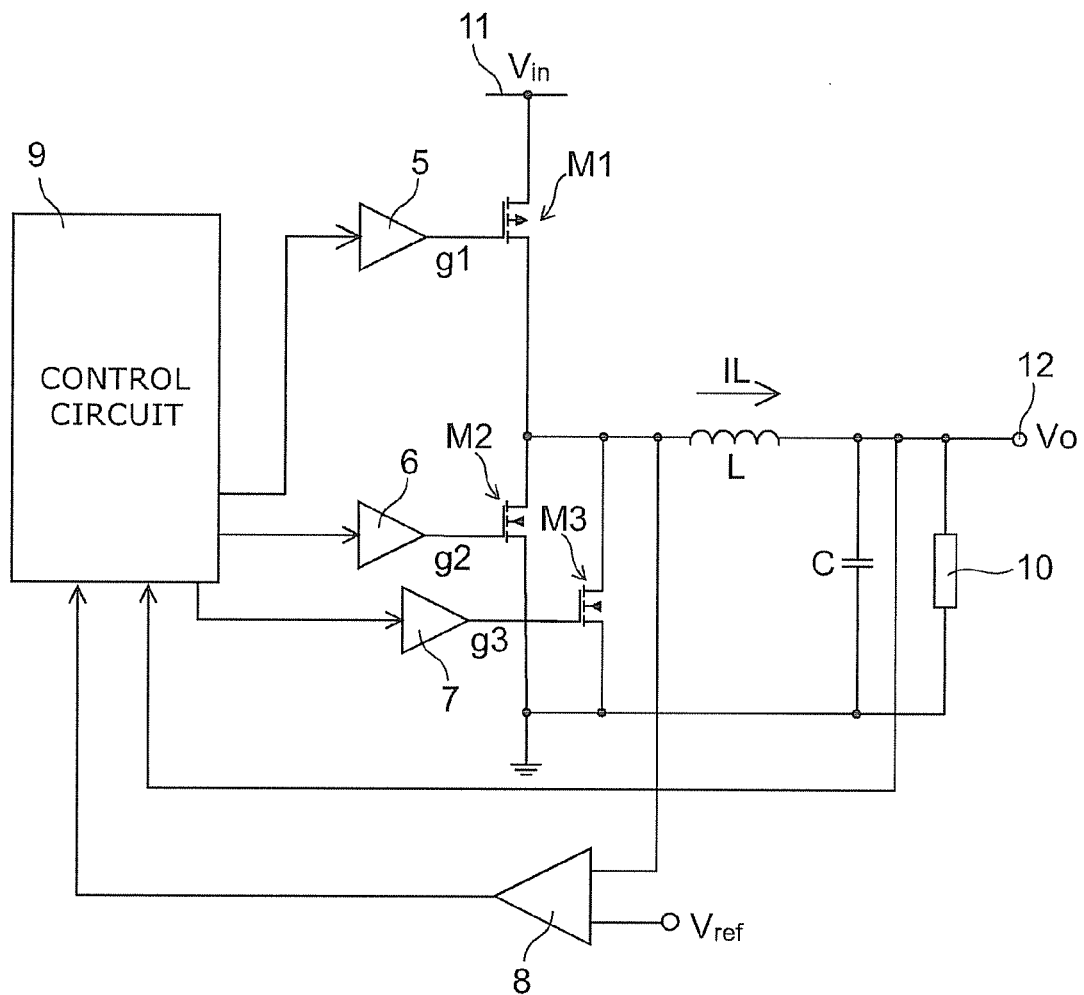
FIG. 1 is a schematic view showing an embodiment of a DC-DC converter of the invention.

FIG. 1 is a schematic view showing the DC-DC converter.

The DC-DC converter includes a first switching element M1 that is a high-side switching element, a second switching element M2 and a third switching eminent M3 that are a low-side switching element, a driver 5 for driving a gate of the first switching element M1, a driver 6 for driving a gate of the second switching element M2, a driver 7 for driving a gate of the third switching element M3, a control circuit 9 for controlling the drivers 5 to 7, an inductor L that is an inductive load, a condenser C, and a detection circuit 8.

The DC-DC convertor is a step-down DC-DC converter (buck converter). The high-side switching element and the low-side switching element are alternately switched ON/OFF. An (average) output voltage $V_O$ lower than an input voltage $V_{in}$ is outputted to a load 10.

In the components shown in FIG. 1, the first switching element M1, the second switching element M2, the third switching element M3, the drivers 5 to 7, the control circuit 9, and the detection circuit 8 are composed as a power IC that is one chip (or one package).

Each of the switching elements M1, M2, and M3 is MOSFET (Metal-Oxide-Semiconductor Field Effect Transistors). The switching element M1 is switched ON-OFF by gate driving signal g1 supplied from the control circuit 9 through the driver 5. The switching element M2 is switched ON-OFF by gate driving signal g2 supplied from the control circuit 9 through the driver 6. The switching element M3 is switched ON-OFF by gate driving signal g3 supplied from the control circuit 9 through the driver 7.

The first switching element M1 and the inductor L are serially connected between an input voltage line 11 and an output terminal 12. An input voltage $V_{in}$ is supplied to the input voltage line 11. The first switching element M1 is, for example, a P-type MOSFET. A source terminal of the first switching element M1 is connected to the input voltage line 11. A drain terminal of the first switching element M1 is connected to the inductor L.

The second switching element M2 and the third switching element M3 are connected in parallel between a connecting point between the first switching element M1 and the inductor L, and a reference voltage line (such as ground line).

Each of the second switching element M2 and the third switching element M3 is, for example, N-type MOSFET. A drain terminal of the second switching element M2 and a drain terminal of the third switching element M3 are connected to the drain terminal of the first switching element M1 and the inductor L. A source terminal of the second switching element M2 and a source terminal of the third switching element M3 are connected to the ground line.

A connecting point between the inductor L and the output terminal 12 is grounded through a smoothing condenser C. The output voltage is not highly fluctuated in a short time by the smoothing condenser C.

Moreover, a detection circuit 8 is provided. The detection circuit 8 detects a potential of a connecting point between the inductor L and the low-side switching element (the second switching element M2 and the third switching eminent M3). Specifically, the detection circuit 8 is a comparator for comparing the potential of the connecting point between the inductor L and the low-side switching element to the reference potential $V_{ref}$.

Figures 7A, 7B:
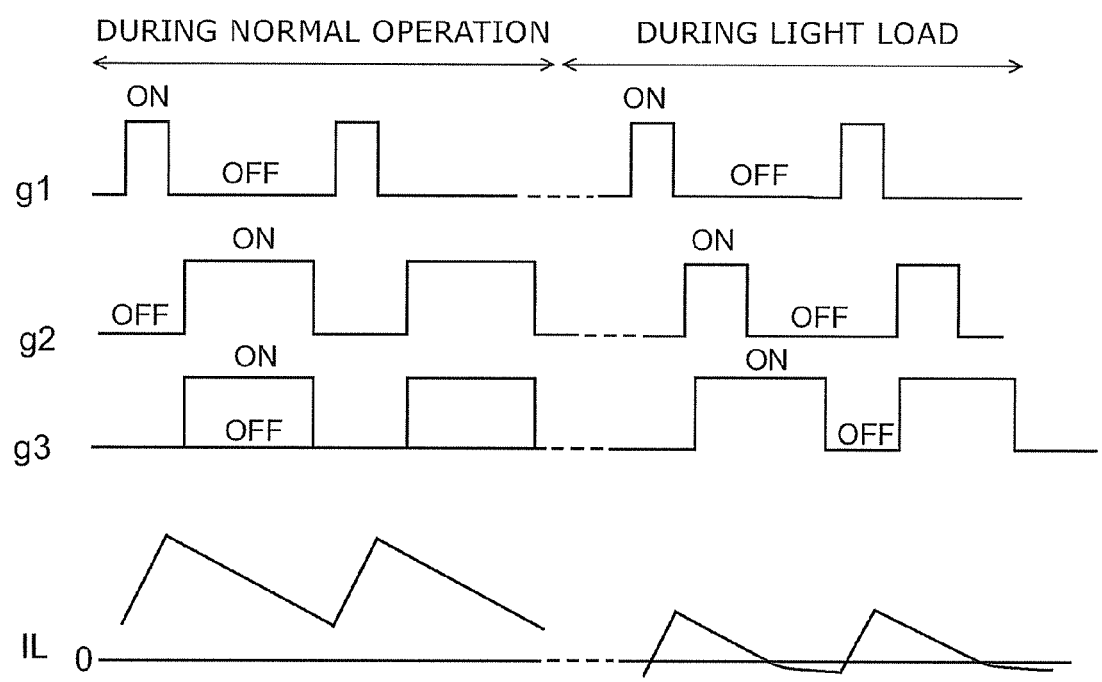
FIG. 7A is waveform chart of gate driving signals g1 to g3 and an inductor current IL in the DC-DC converter shown in FIG. 1 during a normal operation.
FIG. 7B is waveform chart of the gate driving signals g1 to g3 and the inductor current IL in the DC-DC converter shown in FIG. 1 during a light load operation.

FIG. 7A is waveform chart of gate driving signals g1 to g3 and the inductor current IL in the DC-DC converter shown in FIG. 1 during a normal operation but not light load operation. The inductor current IL flows from the inductor L to the load 10 when the inductor current IL is positive. The inductor current IL flows from the inductor L through the low-side switching element to the ground when the inductor current IL is negative.

The gate driving signals g1 and g2 having approximately inverted phases are supplied to a gate terminal of the first switching element M1 and a gate terminal of the second switching element M2. The third switching element M3 is turned ON-OFF at the same timing as the second switching element M2. Or, the third switching element M3 may be always OFF during the normal operation.

When the first switching element M1 is ON and the second switching element M2 and the third switching element M3 are OFF, a current is supplied from the input voltage line 11 through the first switching element M1 and the inductor L to the load 10. In this case, the inductor current IL increases and energy is stored in the inductor L.

And, when the first switching element M1 turns OFF and the second switching element M2 turns ON, the energy stored in the inductor L is released, and the current is supplied from the ground through the second switching element M2 and the inductor L to the load 10. In this case, the third switching element M3 may be OFF. This is because current driving capability when the third switching element M3 operates as MOSFET is sufficiently lower than that of the second switching element M2 as described later. Therefore characteristics of the converter are determined virtually by electric characteristics of the second switching element M2.

Moreover, the output voltage $V_O$ is monitored, and the ON/OFF duties of the first switching element M1 and the second switching element M2 are controlled by the control circuit 9 so that the output voltage $V_O$ becomes a predetermined target voltage.

Moreover, if the first switching element M1 and the second switching element M2 are set to be ON at the same time, a very high current (a pass-through current) comes to flow from the input voltage line 11 through the switching elements M1 and M2 to the ground. For avoiding this, a dead time is being set in setting the duties of ON/OFF of the switching elements M1 and M2. Both of the switching elements M1 and M2 turn OFF at the dead time. From the same reason, the dead time is set so that the first switching element M1 and the third switching element M3 do not turn ON at the same time.

Next, specific structures of the second switching element M2 and the third switching element M3 will be described. Silicon is used as the semiconductor material in the following example. However, other semiconductor materials can be used as well as silicon. Moreover, the description will be performed by setting a first conductivity type to be a P type and setting a second conductivity type to be a N type, but it is also possible that the first conductivity type is the N type and that the second conductivity type is the P type.

Figure 2:
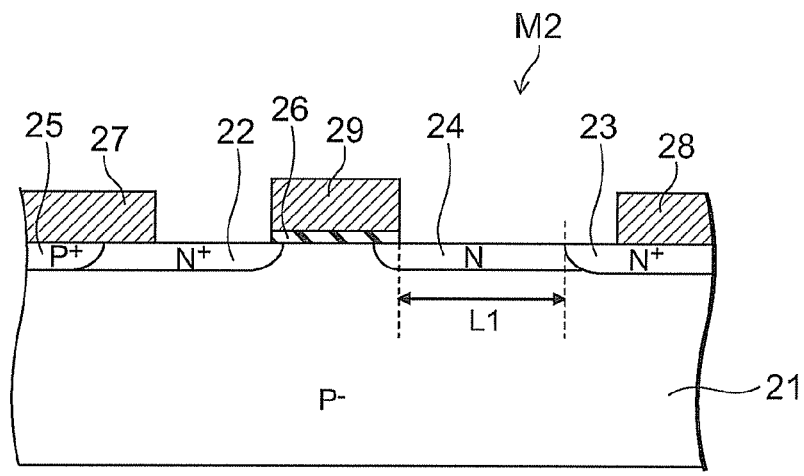
FIG. 2 is a schematic view showing a cross-sectional structure of a relevant part of a second switching element M2 in FIG. 1.

FIG. 2 is a schematic view showing a cross-sectional structure of a relevant part of the second switching element M2.

The second switching element M2 has a LDMOS (Lateral Diffusion Metal-Oxide-Semiconductor) structure. This structure has a $P^-$-type layer 21, a $P^+$-type contact layer 25, a $N^+$-type source layer 22, a N-type drift layer 24, a $N^+$-type drain layer 23, a first main electrode 28, a second main electrode 27 and a gate electrode 29. The $P^-$-type layer 21, the $P^+$-type contact layer 25, the $N^+$-type source layer 22, the N-type drift layer 24 and the $N^+$-type drain layer 23 are formed on a surface portion of the $P^-$-type layer 21. The first main electrode 28, the second main electrode 27 and the gate electrode 29 are provided on the surfaces of the $P^-$-type layer 21, the $P^+$-type contact layer 25, the $N^+$-type source layer 22, the N-type drift layer 24 and the $N^+$-type drain layer 23.

The source layer 22 and the drain layer 23 are provided so as to be separate from each other. The drift layer 24 is provided between the source layer 22 and the drain layer 23 so as to contact the drain layer 23. The drift layer 24 has a lower impurity concentration than the source layer 22 and the drain layer 23.

The gate electrode 29 is provided on the surface of the P⁻-type layer 21 between the source layer 22 and the drift layer 24 through a gate insulating film 26. The contact layer 25 of the P⁺-type is provided so as to contact the source layer 22 at the end opposite to the gate electrode 29 side in the source layer 22. The P⁺-type contact layer 25 has a higher impurity concentration than that of the P⁻-type layer 21.

The second main electrode 27 functioning as a source electrode is provided on the surfaces of the source layer 22 and the contact layer 25. Thereby, the source layer 22 is electrically connected to the second main electrode 27. The P⁻-type layer 21 is set to have a source potential through the contact layer 25. The first main electrode 28 functioning as a drain electrode is provided on the surface of the drain layer 23. The drain layer 23 is electrically connected to the first main electrode 28.

When predetermined gate voltage is given to the gate electrode 29, an inversion layer (a channel) of the N type is formed on a surface layer portion of the P⁻-type layer 21 under the gate electrode 29. And a drain current flows between the first main electrode 28 and the second main electrode 27 through the drain layer 23, the drift layer 24, the channel, and the source layer 22.

Low ON resistance and high-speed property are required for the switching elements used in a DC-DC converter. For realizing the high-speed property, it is important to reduce the capacity between the gate and the drain.

In the case of the structure shown in FIG. 2, the gate electrode 29 is used as a mask and the drift layer 24 is self-aligned. Thereby, the capacity between the gate and the drain is set to be as small as possible. That is, the drift layer 24 is formed by implanting N-type impurities into the surface layer portion of the P⁻-type layer 21 after formation of the gate electrode 29. In general, heat treatment steps are hardly conducted after formation of the gate electrode because the heat treatments affect CMOS composing drivers mixed-mounted together with the high-side switching element and the low side switching element. Therefore, a junction depth (N-type impurity diffusion depth) of the drift layer 24 into the P⁻-type layer 21 is shallow.

With reference to FIG. 1 again, the drain terminals of the low-side switching elements (the second switching element M2 and the third switching element M3) are external terminals for being connected to the inductor L. The inductor L is an external component to the IC in which the switching elements are formed as the integrated circuits. Therefore, the external terminals can be exposed to ESD (Electro Static Discharge). The IC is required not to be broken, even if a surge (an instantaneously generated excessive voltage and an electrical stress such as current pulse) is applied to the external terminal.

In the structure shown in FIG. 2, when the ESD surge is applied to the drain terminals, the electric field between the gate and the drain becomes strong and a high avalanche current flows. The current concentrates on the drift layer 24 and the problem of reliability lowering is feared because the junction depth of the drift layer 24 is shallow as described above.

Accordingly, the third switching element M3 functioning as the ESD protection element is provided in parallel to the second switching element M2 in this embodiment.

Figure 3:
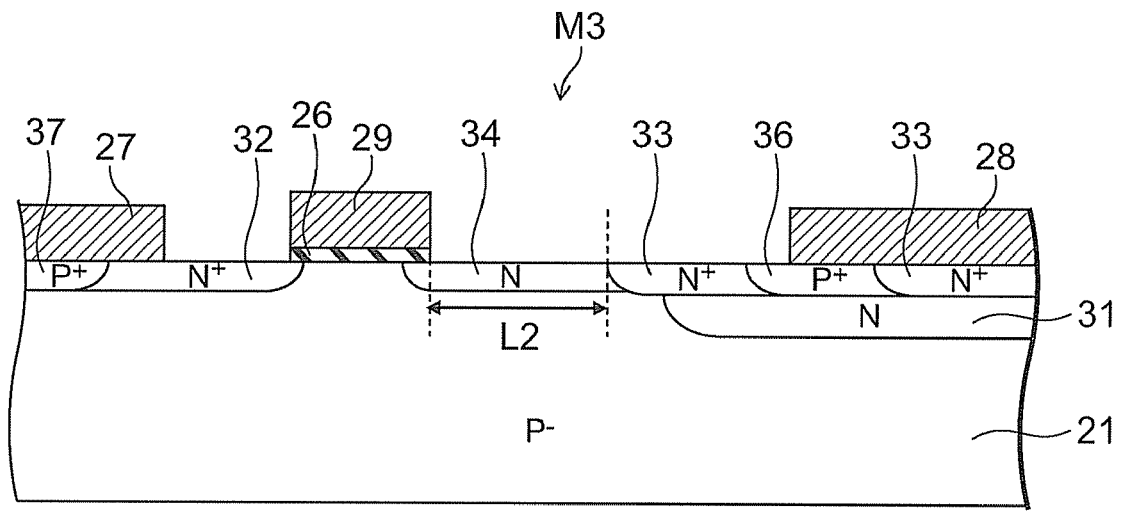
FIG. 3 is a schematic view showing a cross-sectional structure of a relevant part of a third switching element M3 in FIG. 1.

FIG. 3 is a schematic view showing the cross-sectional structure of a relevant part of the third switching element M3.

The third switching element M3 has the LDMOS structure similarly to the second switching element M2. The LDMOS structure has the P⁻-type layer 21, a P⁺-type contact layer 37, a N⁺-type source layer 32, a N-type drift layer 34, a N⁺-type drain layer 33, the first main electrode 28, the second main electrode 27 and the gate electrode 29. The P⁺-type contact layer 37, the N⁺-type source layer 32, the N-type drift layer 34 and the N⁺-type drain layer 33 are formed on the surface layer portion of the P⁻-type layer 21. The first main electrode 28, the second main electrode 27 and the gate electrode 29 are provided on the surfaces of the P⁻-type layer 21, the P⁺-type contact layer 37, the N⁺-type source layer 32, the N-type drift layer 34 and the N⁺-type drain layer 33.

The source layer 32 and the drain layer 33 are provided so as to be separate from each other. The drift layer 34 is provided so as to contact the drain layer 33 between the source layer 32 and the drain layer 33. The drift layer 34 has a lower impurity concentration than the source layer 32 and the drain layer 33.

The gate electrode 29 is provided on the surface of the P⁻-type layer 21 between the source layer 32 and the drift layer 34 through the gate insulating film 26. The P⁺-type contact layer 37 is provided so as to contact the source layer 32 at the end opposite to the gate electrode 29 side in the source layer 32. The P⁺-type contact layer 37 has a higher impurity concentration than the P⁻-type layer 21.

Furthermore, a P⁺-type anode layer 36 is provided in the drain layer 33, and an N-type layer 31 is provided under the drain layer 33 and the anode layer 36 so as to contact them in the third switching element M3.

The second main electrode 27 is provided on the surfaces of the source layer 32 and the contact layer 37. Thereby, the source layer 32 is electrically connected to the second main electrode 27, and the P⁻-type layer 21 is set to have the source potential through the contact layer 37. The first main electrode 28 is provided on the surfaces of the drain layer 33 and the anode layer 36. The drain layer 33 and the anode layer 36 are electrically connected to the first main electrode 28.

The anode layer 36, the N-type layer 31 and the P⁻-type layer 21 constitute a bipolar transistor of a PNP type, the contact layer 37, the P⁻-type layer 21 and the N-type layer 31 constitute a bipolar transistor of an NPN type, and the PNP-type transistor and the NPN-type transistor constitute a thyristor in the third switching element M3. During the thyristor operation, the first main electrode 28 functions as an anode electrode, and the second main electrode 27 functions as a cathode electrode.

Accordingly, the third switching element M3 has a MOS structure section and a thyristor structure section. The MOS structure section and the thyristor structure section are connected in parallel between the first main electrode 28 and the second main electrode 27.

When the ESD surge does not apply into the drain terminal and the voltage applied between the first main electrode 28 and the second main electrode 27 is within a rated voltage, the above thyristor does not operate, and the MOS structure section is turned ON-OFF according to the gate voltage applied to the gate electrode 29. That is, the channel is formed in the surface layer portion of the P⁻-type layer 21 under the gate electrode 29 if voltage of threshold voltage or more is applied to the gate electrode 29. And a current flows between the first main electrode 28 and the second main electrode 27 through the drain layer 33, the drift layer 34, the channel, and the source layer 32. This current path is set to be the main current path. When the gate voltage is lower than the threshold voltage, the channel is not formed under the gate electrode 29. The current does not flow between the first main electrode 28 and the second main electrode 27, and the third switching element M3 enters the OFF state.

With respect to the above main current path in the MOS structure section, the thyristor functions as a surge current path. The surge current flows through the surge current path during the surge application.

The thyristor of the third switching element M3 is activated by avalanche breakdown which serves as the trigger. The third switching element M3 is designed so that the breakdown voltage thereof is lower than that of the second switching element M2 in order that the avalanche breakdown occurs in the third switching element M3 when the surge is applied into the above external terminals (the drain terminals of the low-side switching element). Specifically, a length L2 of the drift layer 34 in the third switching element M3 is shorter than a length L1 of the drift layer 24 in the second switching element M2 (L1>L2). Here, the length of the drift layer means the length of the drift layer in the direction of connecting the gate and the drain.

When positive surge voltage in which the first main electrode 28 comes to have higher potential than the second main electrode 27, is applied to the above external terminals, high voltage is applied between the gate voltage 29 and the first main electrode 28. And the drift layer is depleted. The gate voltage 29 has the same potential as the potential of the second main electrode 27 through a pull-down resistor not shown. The breakdown voltage of the third switching element M3 is lower than that of the second switching element M2 because the length of the drift layer of the third switching element M3 is shorter than that of the second switching element M2. The electric field intensity of the gate electrode 29 side end of the drain layer 33 in the third switching element M3 becomes higher, and the avalanche breakdown is caused at the gate electrode 29 side end.

The avalanche breakdown generates electrons and holes, and the holes flow to the second main electrode 27 through the P⁻-type layer 21 and the contact layer 37, and the electrons flow from the gate electrode 29 side end of the drain layer 33 to the first main electrode 28 through the N-type layer 31 under the anode layer 36.

Voltage lowering occurs by parasitic resistance existing in the N-type layer 31 when the electrons move through the N-type layer 31. The anode layer 36 has an ohmic contact with the first main electrode 28. The potential of the anode layer 36 has the same potential as the first main electrode 28. Assuming that the potential of the anode layer 36 is Vd, the resistance of the N-type layer 31 is R, and the current flowing through the N-type layer 31 is I, the potential of the N-type layer 31 becomes (Vd−RI). The potential (Vd−RI) is lower than the potential Vd of the anode layer 36.

Accordingly, a forward bias is applied to a PN junction between the anode layer 36 and the N-type layer 31, and holes are injected from the anode layer 36 into the P⁻-type layer 21. The holes becomes a base current of the NPN transistor and a collector current of the NPN transistor flowing according the base current of the NPN transistor becomes a base current of the PNP transistor, and a collector current of the PNP transistor flowing according the base current of the PNP transistor becomes the base current of the NPN transistor. The cycle like this is repeated and the thyristor is activated.

When the thyristor is activated, the path between the first main electrode 28 and the second main electrode 27 through the thyristor enters a low-resistance state of being capable of flowing high current therethrough. Thereby, the surge current can be rapidly discharged to the ground through the thyristor with the smaller device area. That is, the third switching element M3 performs the thyristor operation with good response, rapidly attracts the surge current, and flows the surge current to the ground during the application of the surge voltage. Thereby, the breakdown of the second switching element M2 due to the surge can be prevented.

It can be also contemplated that without providing the third switching element M3 having an ESD protection function, the second switching element M2 in itself is set to have an element structure that is excellent in ESD capacity. However, in general, the distance between the first main electrode and the second main electrode becomes long for providing the ESD capacity, and the ON resistance when the second switching element functions as the switching element of the converter becomes high.

In this embodiment, the third switching element M3 has the function as the ESD protection element, and the second switching element M2 has most of the functions as the low-side switching element in the DC-DC converter. Therefore, the second switching element M2 can be designed so that the characteristics required in the converter is put first in everything. That is, the primary characteristics of the DC-DC converter cannot be damaged and additionally the protection from ESD can be realized by composing the low-side switching element from the second switching element M2 and the third switching element M3 bearing part of the respective functions.

Figure 4:
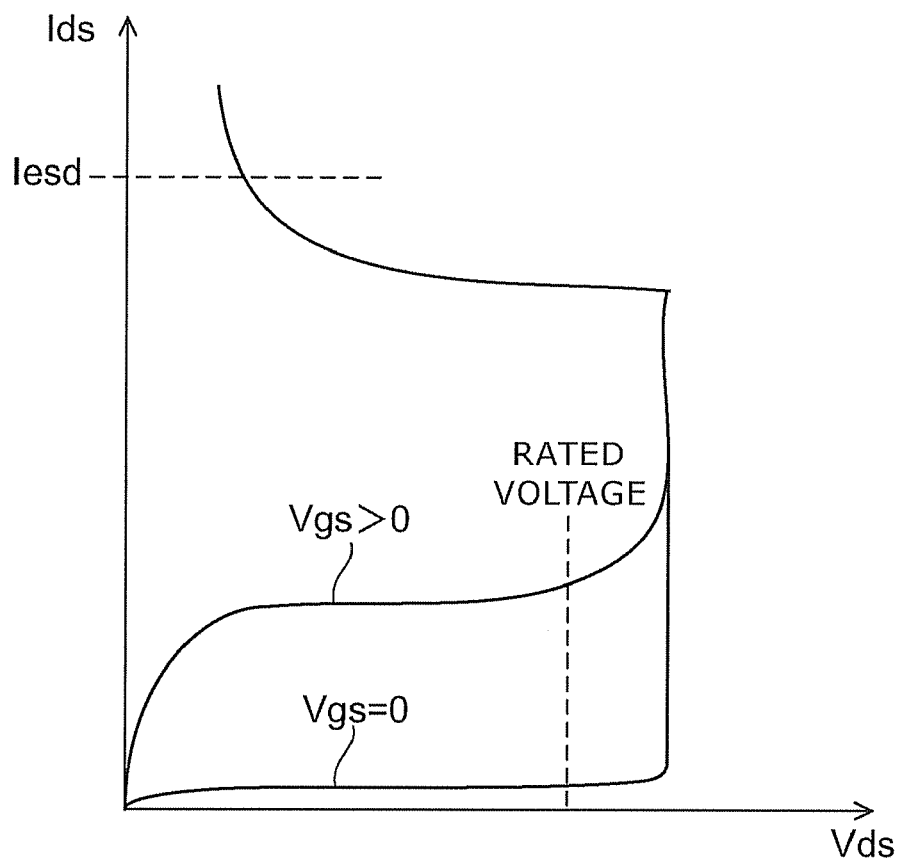
FIG. 4 is a characteristic diagram showing a relationship of a voltage Vds between a first main electrode and a second main electrode to a drain current Ids in the third switching element M3 shown in FIG. 3.

FIG. 4 is a characteristic view showing the relationship between the drain-source voltage Vds (the voltage between the first main electrode 28 and the second main electrode 27) in the third switching element M3, and the drain current Ids. Iesd of the vertical axis is the maximum current value of the ESD surge current. Moreover, FIG. 4 shows the cases where the gate voltage Vgs is zero V (Vgs=0) and is larger than zero V (Vgs>0).

The third switching element M3 does not perform the thyristor operation when the drain-source voltage Vds is within the rated voltage, but performs the thyristor operation when high voltage of ESD higher than the rated voltage is applied thereto. That is, the third switching element M3 functions as a switching MOSFET when the voltage is within the rated voltage and functions as the ESD protection element during the application of ESD thereto.

Figure 5:
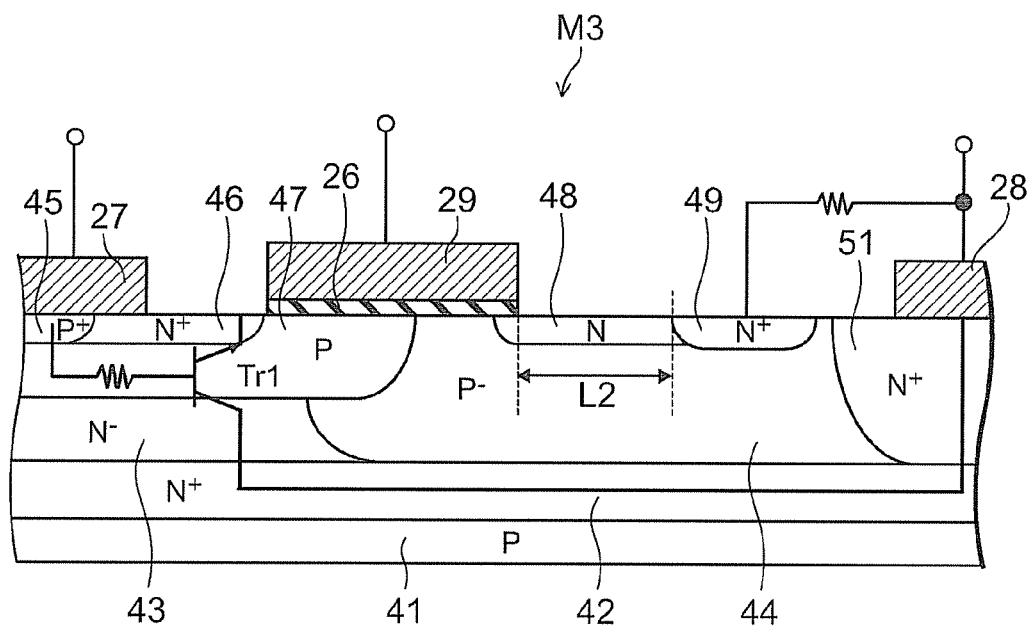
FIG. 5 is a schematic cross-sectional view showing another example of the third switching element M3 in FIG. 1.

Next, FIG. 5 is a schematic cross-sectional view showing another example of the third switching element M3.

The third switching element M3 shown in FIG. 5 has the following structure. A N⁺-type buried layer 42 with high impurity concentration is provided on a P-type substrate 41. A N⁻-type layer 43 and a P⁻-type layer 44 are selectively provided on the N⁺-type buried layer 42. A P-type base layer 47 is provided to be contiguous to the P⁻-type layer 44 on the N⁻-type layer 43.

A N⁺-type source layer 46 and a P⁺-type contact layer 45 are selectively provided on the surface layer portion of the P-type base layer 47. The source layer 46 is contiguous to the contact layer 45. The second main electrode 27 is provided on the surface of the source layer 46 and the contact layer 45. The source layer 46 and the contact layer 45 are electrically connected to the second main electrode 27. The potential of the second main electrode 27 is given to the P-type base layer 47 through the contact layer 45.

A N⁺-type drain layer 49 and a N-type drift layer 48 are selectively provided on the surface layer part of the P⁻-type layer 44. The drift layer 48 is located between the source layer 46 and the drain layer 49, and contiguous to the drain layer 49. The drift layer 48 has lower impurity concentration than the drain layer 49. For example, the impurity concentration of the drift layer 48 is $2 \times 10^{12}$ to $4 \times 10^{12}/cm^2$.

The gate electrode 29 is provided on the surface layer part of the P-type base layer 47 and the P⁻-type layer 44 between the source layer 46 and the drift layer 48 through the gate insulating film 26.

A N⁺-type layer 51 is provided to reach the element surface on the N⁺-type buried layer 42 of the drain layer 49 side. The drain layer 49 and the N⁺-type layer 51 are connected through a resistor. The drain layer 49 and the N⁺-type layer 51 are electrically connected to the first main electrode 28.

The drain layer 49, the drift layer 48, the gate electrode 29, the channel formation region under the gate electrode 29 in the P-type base layer 47 and the P-type layer 44, and the source layer 46 constitute the LDMOS in the third switching element M3 shown in FIG. 5. Moreover, the source layer 46, the P-type base layer 47, the N⁻-type layer 43, the N⁺-type buried layer 42, and the N⁺-type layer 51 constitute a NPN-type bipolar transistor Tr1. The LDMOS and the bipolar transistor Tr1 are connected in parallel between the first main electrode 28 and the second main electrode 27. The bipolar transistor Tr1 functions as the surge current path. The surge current flows through the surge current path during the application of the surge.

The bipolar transistor Tr1 is activated by the avalanche breakdown which serves as the trigger. Accordingly, the third switching element M3 is designed so that the breakdown voltage thereof is lower than that of the second switching element M2 in order that the avalanche breakdown occurs in the third switching element M3 when the surge is applied into the above external terminals (the drain terminals of the low-side switching element). That is, a length L2 of the drift layer 48 of the third switching element M3 shown in FIG. 5 is shorter than the length L1 of the drift layer 24 of the second switching element M2 shown in FIG. 2 (L1>L2).

When the positive surge voltage is applied to the above external terminals, high voltage is applied between the gate electrode 29 having the same potential as the potential of the second main electrode 27 through a pull-down resistor as not shown, and the first main electrode 28. And thus the drift layer is depleted. Here, the breakdown voltage of the third switching element M3 is lower than that of the second switching element M2. The length of the drift layer of the third switching element M3 is shorter than that of the second switching element M2. Accordingly, the electric field intensity of the gate electrode 29 side end of the drain layer 49 in the third switching element M3 becomes higher, and the avalanche breakdown is caused at the point.

Electrons and holes are generated by the avalanche breakdown, and the electrons flow to the first main electrode 28, and the holes flow to the second main electrode 27 through the P⁻-type layer 44, the P-type base layer 47, and the contact layer 45.

Voltage lowering occurs by parasitic resistance existing in the P-type base layer 47 when the holes move through the P-type base layer 47. That is, assuming that the potential of the source layer 46 having an ohmic contact with the second main electrode 27 and having the same potential as the second main electrode 27 is Vs, the resistance of the P-type base layer 47 is R, and the current flowing through the P-type base layer 47 is I, the potential under the source layer 46 in the P-type base layer 47 becomes (Vs−RI), which is lower than Vs.

Accordingly, a forward bias is applied to the PN junction between the source layer 46 and the P-type base layer 47, and electrons are injected from the source layer 46 into the N⁻-type layer 43 and the N⁺-type buried layer 42. Thereby, the NPN-type bipolar transistor Tr1 is activated.

When the bipolar transistor Tr1 is activated, the path between the first main electrode 28 and the second main electrode 27 through the bipolar transistor Tr1 enters a low-resistance state of being capable of flowing high current therethrough. Thereby, the surge current can be rapidly discharged to the ground through the bipolar transistor Tr1 with the smaller device area. That is, the third switching element M3 performs the thyristor operation with good response, rapidly attracts the surge current, and flows the surge current to the ground during the application of the surge voltage. Thereby, the breakdown of the second switching element M2 due to the surge can be prevented.

When the negative surge voltage (the first main electrode 28 comes to have lower potential than the second main electrode 27) is applied to the above external terminals, a forward bias is applied to a PN diode composed of the contact layer 45, the P-type base layer 47, the P⁻-type layer 44, the N⁺-type buried layer 42, the N⁺-type layer 51, and the drain layer 49, and the surge current rapidly flows to the ground through the diode.

When the ESD surge is not applied and the voltage applied between the first main electrode 28 and the second main electrode 27 is within the rated voltage, the above bipolar transistor Tr1 does not operate, and the LDMOS is turned ON-OFF according to the gate voltage applied to the gate electrode 29.

That is, when the voltage of the threshold voltage or more is applied to the gate electrode 29, a channel is formed in the surface layer portion of the P-type base layer 47 and the P⁻-type layer 44 under the gate electrode 29. And a current flows between the first main electrode 28 and the second main electrode 27 through the drain layer 49, the drift layer 48, the channel, and the source layer 46. When the gate voltage is lower than the threshold voltage, the channel is not formed under the gate electrode 29. And conduction is not allowed between the first main electrode 28 and the second main electrode 27, and the third switching element M3 enters the OFF state.

Figure 6:
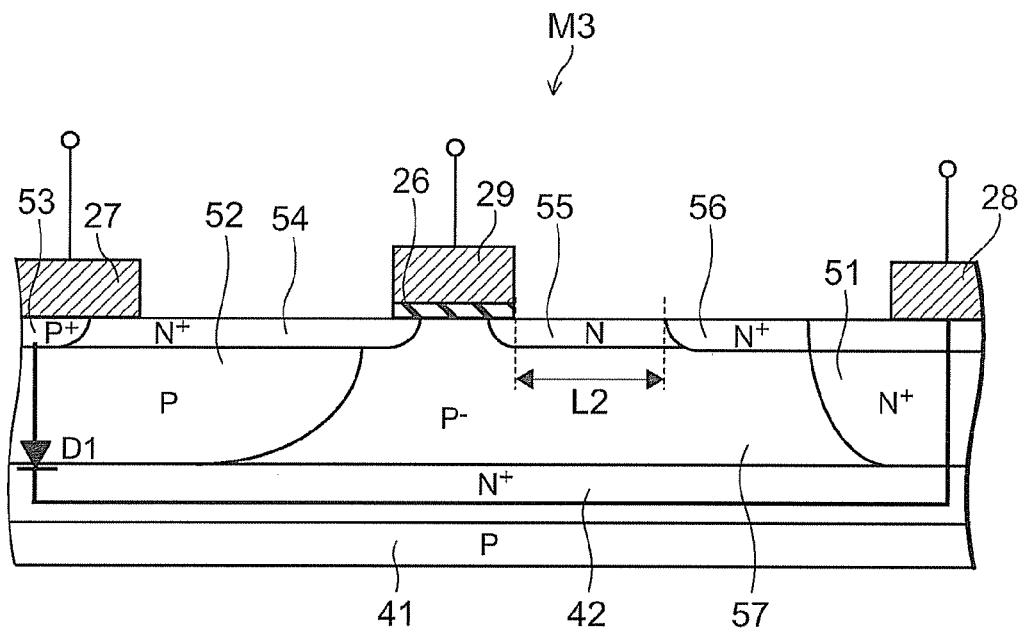
FIG. 6 is a schematic cross-sectional view showing another example of the third switching element M3 in FIG. 1.

Next, FIG. 6 is a schematic cross-sectional view showing another example of the third switching element M3.

The third switching element M3 shown in FIG. 6 has the following structure. The N⁺-type buried layer 42 with high impurity concentration is provided on the P-type substrate 41. A P-type layer 52 and a P⁻-type layer 57 are provided to be contiguous to each other on the N⁺-type buried layer 42.

A N⁺-type source layer 54 is selectively provided on the surface layer portion of the P-type layer 52 and the P⁻-type layer 57. Moreover, a P⁺-type contact layer 53 is provided to be contiguous to the source layer 54 in the surface layer portion of the P-type layer 52.

The second main electrode 27 is provided on the surfaces of the source layer 54 and the contact layer 53. The source layer 54 and the contact layer 53 are electrically connected to the second main electrode 27. Moreover, the potential of the second main electrode 27 is given to the P-type layer 52 through the contact layer 53.

A N⁺-type drain layer 56 and an N-type drift layer 55 are selectively provided on the surface layer portion of the P⁻-type layer 57. The drift layer 55 is located between the source layer 54 and the drain layer 56 and contiguous to the drain layer 56. The drift layer 55 has lower impurity concentration than the drain layer 56, for example, the impurity concentration of the drift layer 55 is $2 \times 10^{12}$ to $4 \times 10^{12}/cm^2$.

The gate electrode 29 is provided on the surface of the P⁻-type layer 57 between the source layer 54 and the drift layer 55 through the gate insulating film 26.

The N⁺-type layer 51 is provided on the N⁺-type buried layer 42 under the drain layer 56 so as to contact the drain layer 56. The drain layer 56 and the N⁺-type layer 51 are electrically connected to the first main electrode 28.

The drain layer 56, the drift layer 55, the gate electrode 29, the channel formation region under the gate electrode 29 in the P⁻-type layer 57, and the source layer 54 constitute the LDMOS in the third switching element M3 shown in FIG. 6. Moreover, the contact layer 53, the P-type layer 52, the N⁺-type buried layer 42, and the N⁺-type layer 51 constitute a PN diode D1. The LDMOS and the PN diode D1 are connected in parallel between the first main electrode 28 and the second main electrode 27. The PN diode D1 functions as the surge current path through which the surge current flows during the application of the surge.

The third switching element M3 is designed so that the breakdown voltage thereof is lower than that of the second switching element M2 in order that the avalanche breakdown occurs in the above diode D1 of the third switching element M3 when the surge bursts into the above external terminals (the drain terminals of the low-side switching element).

Moreover, the breakdown voltage between the first main electrode 28 and the gate electrode 29 of the LDMOS is set to be higher than the breakdown voltage of the diode D1 in the third switching element M3. Such relation of the breakdown voltages can be controlled by making the length L2 of the drift layer 55 longer, making the diffusion depth of the P-type layer 52 deeper, making the impurity concentration of the P-type layer 52 higher, or the like.

When the positive surge voltage (a reverse bias for the diode D1) is applied to the above external terminals, the diode D1 shows the avalanche breakdown. The place of the avalanche breakdown is the junction plane between the P-type layer 52 and the N⁺-type buried layer 42. The electric-field concentration place is formed over the entirety of the relatively large plane and therefore the current concentration is difficult to be caused, the diode D1 has an electric characteristics of being strong for the break. The path between the first main electrode 28 and the second main electrode 27 through the diode D1 enters a low-resistance state of being capable of flowing large current therethrough by the above avalanche breakdown. The surge current can rapidly flow to the ground through the diode D1.

When the negative surge voltage is applied to the external terminals, the surge current rapidly flows through the diode D1 to the ground because the voltage has the forward bias for the diode D1.

When the ESD surge is not applied and the voltage applied between the first main electrode 28 and the second main electrode 27 is within the rated voltage, the above diode D1 does not operate, and the LDMOS is turned ON-OFF according to the gate voltage applied to the gate electrode 29.

That is, when the voltage of the threshold voltage or more is applied to the gate electrode 29, a channel is formed in the surface layer portion of the P⁻-type layer 57 under the gate electrode 29. A current flows between the first main electrode 28 and the second main electrode 27 through the drain layer 56, the drift layer 55, the channel, and the source layer 54. When the gate voltage is lower than the threshold voltage, the channel is not formed under the gate electrode 29. Conduction is not allowed between the first main electrode 28 and the second main electrode 27, and the third switching element M3 enters the OFF state.

Next, the timing of switching ON/OFF of the second switching element M2 and the third switching element M3 will be described.

During the normal operation, the third switching element M3 turns ON at the same timing as the second switching element M2 as shown in FIG. 7A. When the low-side switching element is ON, the second switching element M2 and the third switching element M3 supply a current through the inductor L to the load 10. However, the third switching element M3 does not affect the characteristics of the converter even when the third switching element M3 is always OFF. This is because the current driving capability of the third switching element M3 is sufficiently smaller than that of the second switching element M2 as described later and therefore the characteristics of the converter are determined virtually by the electric characteristics of the second switching element M2.

In the period when the high-side switching element (the first switching element M1) is ON and the low-side switching element (the second switching element M2 and the third switching element M3) are OFF, the (positive) inductor current IL flowing in the direction toward the load 10 comes to increase, and energy is stored in the inductor L.

The current flowing through the load 10 is low during the light load operation. If the current flowing through the inductor L is low during the light load operation, the energy stored in the inductor L when the high-side switching element (the first switching element M1) is ON, is low. Therefore, the energy stored in the inductor L becomes zero at certain timing in the period in which the low-side switching element is ON. Then, the current flowing through the inductor L flows from the load 10 through the low-side switching element to the ground. The current is not supplied to the load 10 and therefore becomes invalid current, and the conversion efficiency of the power (output power/input power×100%) is drastically lowered.

It is required that the conversion efficiency of the DC-DC converter is excellent also during the light load operation in a battery-driven instrument such as a portable device.

Accordingly, the second switching element M2 is set to have the current driving capability required for the desired converter characteristics and by contrast the third switching element M3 is set to have the sufficiently lower current driving capability than that of the second switching element M2 in this embodiment. Here, the current driving capability is a current driving capability not during the application of the ESD surge but during the operation as the MOFET within the rated voltage. The current driving capability of the third switching element M3 being lower than that of the second switching element M2 means that the ON resistance of the third switching element M3 is higher than that of the second switching element M2.

For example, the current driving capability of the third switching element M3 can be set to be lower than that of the second switching element M2 by setting the cell area of the third switching element 3 to be smaller than the cell area of the second switching element M2. The current driving capability of the third switching element M3 can be set to be lower than that of the second switching element M2 by setting the threshold voltage of the third switching element M3 to be higher than that of the second switching element M2.

Moreover, the DC-DC converter of this embodiment has the detection circuit 8 as described above with reference to FIG. 1. The detection circuit 8 monitors the potential of the connecting point between the low-side switching elements (the second switching element M2 and the third switching element M3) and the inductor L. The detection circuit 8 detects the potential of the above connecting point and compares the potential to the reference potential Vref.

In the period when the high-side switching element is OFF and the low-side switching element is ON during the normal operation but not the light load operation, the current flows from the ground through the low-side switching element to the above connecting point. Therefore the potential of the above connecting point becomes negative potential.

In the period when the high-side switching element is OFF and the low-side switching element is ON during the light load operation, when the energy stored in the inductor becomes zero and the current flows from the load 10 through the inductor L and the low-side switching element to the ground, the potential of the above connecting point becomes positive potential.

Accordingly, it can be found whether the inductor current IL is positive or negative from the comparison result between the potential of the above connecting point and the reference potential Vref. The period when the second switching element M2 turns OFF and the third switching element M3 turns ON is provided during the inductor current IL is negative as shown in FIG. 7B showing the timing chart during the light load operation in this embodiment.

Only the third switching element M3 enters the ON state when the inductor current IL is negative because the third switching element M3 has lower current driving capability (the ON resistance of the third switching element M3 is high). Thereby, the current flowing from the inductor L through the low-side switching element to the ground can be suppressed to be low. That is, the invalid current that is not supplied to the load 10 but is supplied to the ground is reduced, and lowering of the efficiency can be suppressed.

Figure 8:
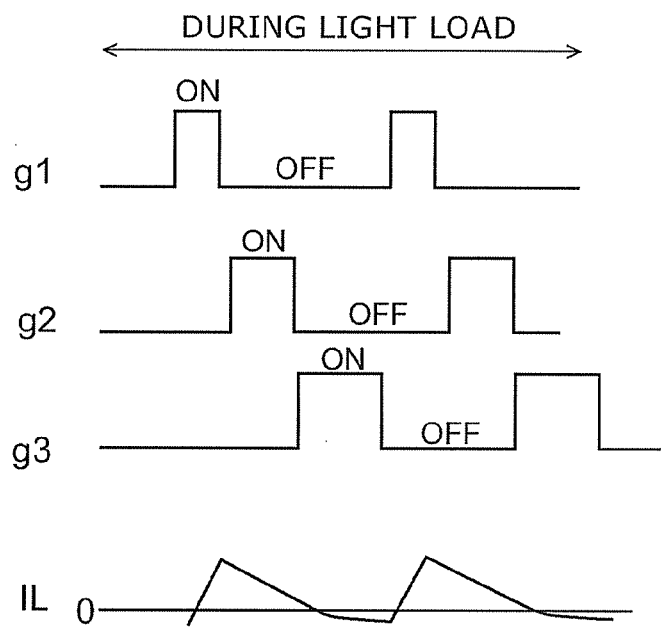
FIG. 8 is waveform chart illustrating an example in which operation timings of the second switching element M2 and the third switching element M3 during light load operation differ from those of the example shown in FIG. 7B.

There is a period when the second switching element M2 and the third switching element M3 are set to be ON simultaneously in the timing example shown in FIG. 7B. However, it is also possible that there is not the period when the second switching element M2 and the third switching element M3 are ON simultaneously, namely, the third switching element M3 is OFF when the second switching element M2 is ON and the second switching element M2 is OFF when the third switching element M3 is ON as shown in FIG. 8. The current driving capability of the third switching element M3 is sufficiently lower than that of the second switching element M2. Thus the characteristics of the converter are determined virtually by the electric characteristics of the second switching element M2 even when the second switching element M2 and the third switching element M3 are ON simultaneously.

The initiation timing of the period when the second switching element M2 is OFF and the third switching element M3 is ON, is immediately before the inductor current IL becomes zero from the positive in the examples shown in FIGS. 7B and 8. However, the initiation timing may be in a moment of time when, or immediately after, the IL becomes zero. If the third switching element M3 has the period of being ON simultaneously as the first switching element is ON, the pass-through current comes to flow from the input voltage line 11 to the ground. Thus, it is necessary that the third switching element M3 is set to be OFF before the first switching element M1 turns ON.

The efficiency can be improved by setting the switching frequency between the high-side switching element and the low-side switching element to be low during the further light load operation.

Figure 9:
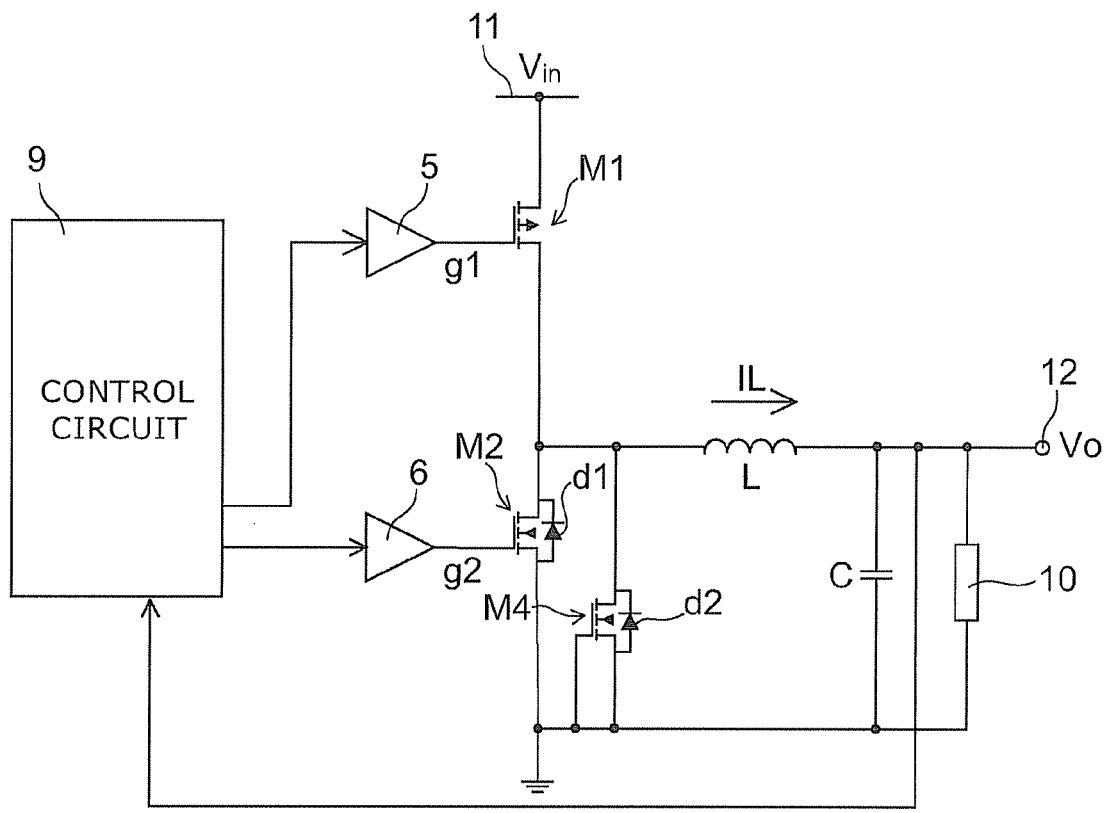
FIG. 9 is a schematic view showing of the DC-DC converter based on the semiconductor device according to another embodiment of the invention.

Next, FIG. 9 is a schematic view showing another embodiment of the invention of the DC-DC converter using the semiconductor device.

Figures 10A, 10B, 10C:
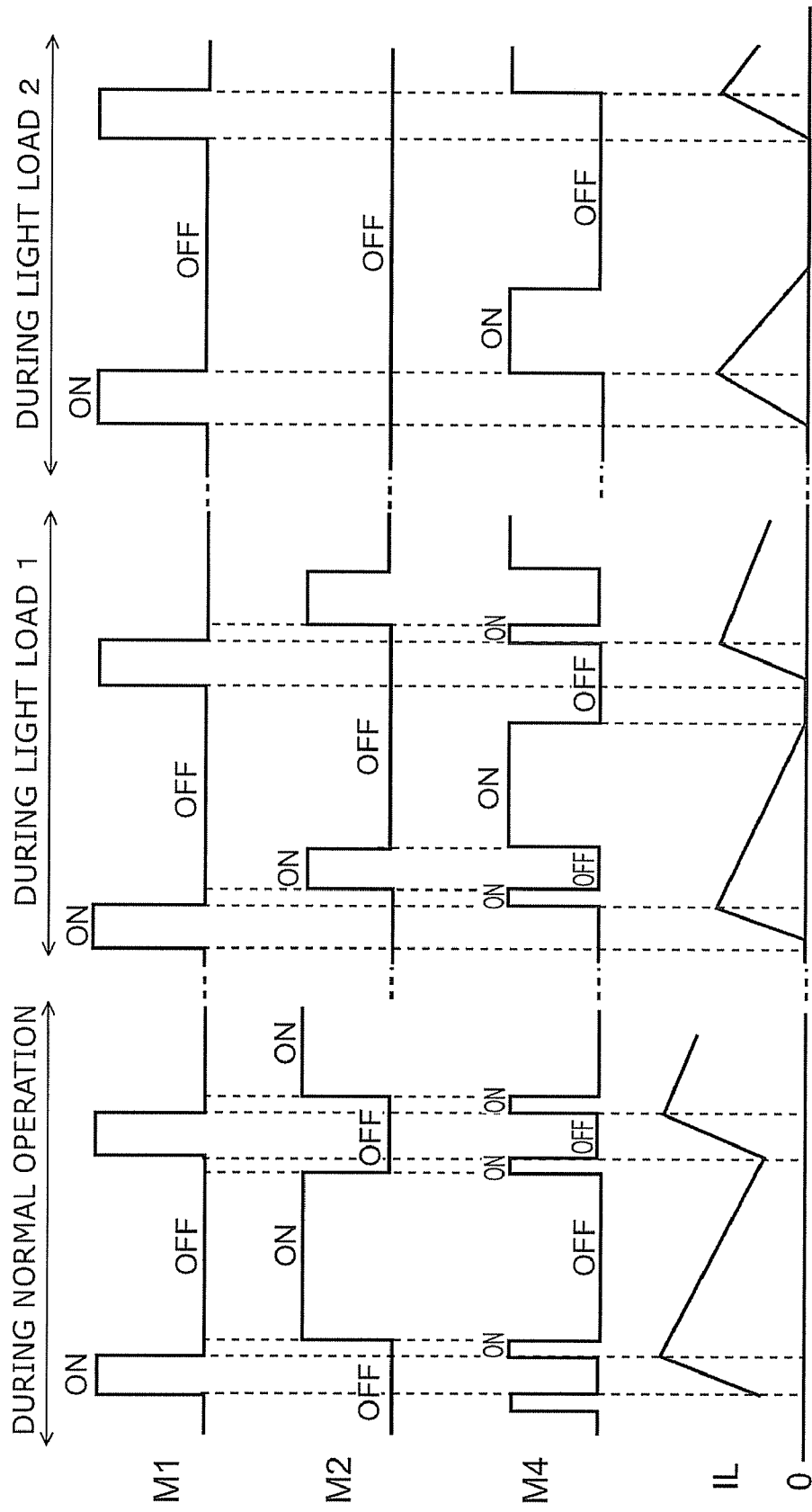
FIGS. 10A to 10C show operation timings of the switching elements M1, M2, and M4 and waveforms of the inductor current IL in the DC-DC converter shown in FIG. 9.

FIGS. 10A to 10C show operation timings of the switching elements M1, M2, and M4 and waveforms of the inductor current IL in the DC-DC converter shown in FIG. 9.

Each of the first switching element M1, the second switching element M2, and the third switching element M4 is MOSFET. Each of the first switching element M1 and the second switching element M2 is turned ON-OFF by the gate driving signals g1 and g2 supplied from the control circuit 9 through drivers 5 and 6 as well as the embodiments described above with reference to FIG. 1. However, this embodiment is different from the embodiment shown in FIG. 1 in the point that a gate of the third switching element M4 is always connected to the ground. Therefore, a gate electrode and a source electrode of the third switching element M4 are electrically short-circuited.

Both of the third switching element M4 and the second switching element M2 function as a low-side switching element in the DC-DC converter. However, they do not necessarily have the ESD protection function, are different from the third switching element M3 in above embodiment.

FIG. 9 shows respective internal diodes (parasitic diodes) d1 and d2 in the second switching element M2 and the third switching element M4. Each of the internal diodes d1 and d2 exists in parallel to a main current path between drain and source of each of the second switching element M2 and the third switching element M4. A direction from the source to the drain is set to be a forward direction.

A size of the second switching element M2 is larger than the size of the third switching element M4.

A threshold voltage of the third switching element M4 is set to be as follows.

$$0<(\text{the threshold voltage of the third switching element } M4)<(\text{an ON voltage of the internal diode } d1 \text{ of the second switching element } M2) \quad (1)$$

Thereby, when a potential of a connecting point between the first switching element M1 and the second switching element M2 becomes higher than—(the threshold voltage of the third switching element M4), the third switching element M4 turns OFF, and when the above potential of the connecting point becomes lower than—(the threshold voltage of the third switching element M4), the third switching element M4 turns ON.

During the normal operation shown in FIG. 10A, in the period when the first switching element M1 is OFF, the potential of the connecting point between the first switching element M1 and the second switching element M2 becomes negative. In the period when both of the first switching element M1 and the second switching element M2 are OFF, if there is not the third switching element M4, the potential of the connecting point between the first switching element M1 and the second switching element M2 becomes—(the ON voltage of the internal diode d1 of the second switching element M2). However, because the third switching element M4 exists, the gate-source voltage of the third switching element M4 becomes the threshold voltage or more from the relation of the above (1) formula. And the third switching element M4 enters an ON state.

When the second switching element M2 enters the ON state, an ON resistance of the third switching element M4 becomes lower than that of the second switching element M2, because the size of the second switching element M2 is larger than that of the third switching element M4 and the gate-source voltage to be applied of the second switching element M2 is higher than that of the third switching element M4. Therefore, the potential of the connecting point between the first switching element M1 and the second switching element M2 becomes near to the ground potential, and the third switching element M4 turns OFF.

During a light load operation 1 shown in FIG. 10B, when the second switching element M2 is set to be ON in a certain period in a regeneration and then the second switching element M2 is set to be OFF, if the inductor current IL flows to the load 10, the potential of the connecting point between the first switching element M1 and the second switching element M2 becomes negative, and the third switching element M4 enters the ON state.

Thereafter, when the inductor current IL gradually flows from the load 10 toward the ground, the potential of the connecting point between the first switching element M1 and the second switching element M2 becomes positive, and the third switching element M4 enters the OFF state. Accordingly, an invalid current flowing from the load 10 to the ground can be cancelled. Moreover, the circuit structure can be simplified because a control circuit for switching ON/OFF of the third switching element M4 is not required.

During a light load operation 2 shown in FIG. 10C that is lighter than the light load operation 1, the second switching element M2 is not set to be ON in a certain period in the regeneration. Thereby, the potential of the connecting point between the first switching element M1 and the second switching element M2 becomes negative, and the third switching element M4 enters the ON state. Then, when the inductor current IL gradually flows from the load 10 toward the ground, the potential of the connecting point between the first switching element M1 and the second switching element M2 becomes positive, and the third switching element M4 enters the OFF state. Accordingly, the invalid current trying to flow from the load 10 toward the ground can be cancelled.

During the light load operation 1 in which the current is relatively high even during an usual light load operation, a conduction loss of the third switching element M4 is much, and thereby, the second switching element M2 is set to be in the ON state in the region in which the load current is relatively high. And, during the light load operation 2 in which the load current is lower, a loss of driving the second switching element M2 is more than the conduction loss of the third switching element M4, and thereby, the operation is performed without setting the second switching element M2 to be in the ON state. Thereby, a conversion efficiency in the low-current region can be improved.

Figure 11:
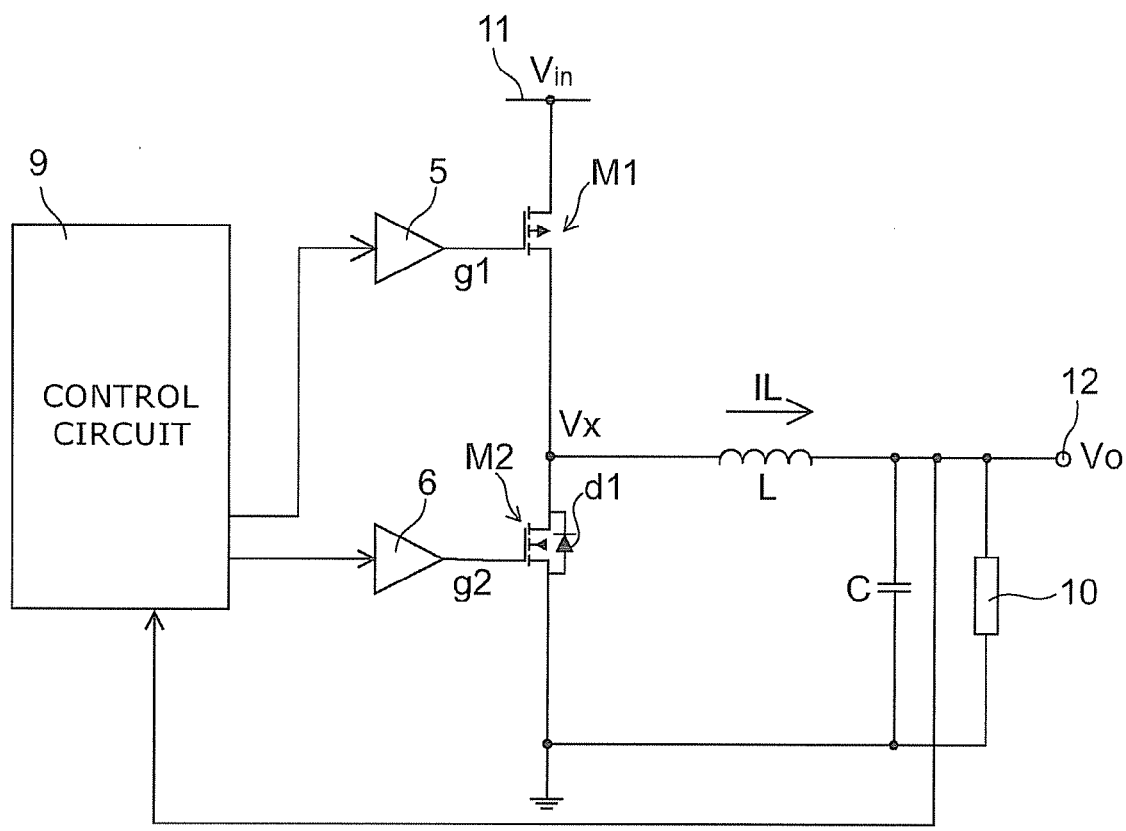
FIG. 11 is a schematic view showing another embodiment of the DC-DC converter based on the semiconductor device according to the invention.

Next, FIG. 11 is a schematic view showing another embodiment of the invention of the DC-DC converter using a semiconductor device.

FIGS. 12A to 12C show waveforms of operation timings of the switching elements M1 and M2, gate voltages g2 of the switching element M2, potentials Vx of the connecting point between the high-side switching element (first switching element M1) and the low-side switching element (second switching element M2), and the inductor current IL in the DC-DC converter shown in FIG. 11.

Each of the first switching element M1 and the second switching element M2 is MOSFET. The first switching element M1 and the second switching element M2 are turned ON-OFF by the gate driving signals supplied from the control circuit 9 through the drivers 5 and 6 as well as the above embodiments. However, this embodiment is different from the embodiment shown in FIG. 9 in the point that the third switching element does not exist.

Moreover, in this embodiment, a threshold voltage of the second switching element M2 is set to be as follows.

$$0 < (\text{a threshold voltage of the second switching element } M2) < (\text{an ON voltage of the internal diode } d1 \text{ of the second switching element } M2) \quad (2)$$

Thereby, when a gate voltage of the second switching element M2 is a reference potential (low level "L"), if the potential Vx of the connecting point between the first switching element M1 and the second switching element M2 becomes higher than—(the threshold voltage of the second switching element M2), the second switching element M2 turns OFF, and when the above potential Vx of the connecting point becomes lower than—(the threshold voltage of the second switching element M2), the second switching element M2 turns ON.

During the normal operation shown in FIG. 12A, in the period when the first switching element M1 is OFF, the potential Vx of the connecting point between the first switching element M1 and the second switching element M2 becomes negative. In the period when the first switching element M1 is OFF and the gate voltage g2 of the second switching element M2 is in the low level "L", the same as the operation timings shown in the FIG. 10A, the second switching element M2 enters the ON state. However, in this case, because a gate bias is low, the ON resistance is high, and thus, the ON resistance can be low if the gate voltage g2 of the second switching element M2 enters the high level "H". Thereby, the potential Vx of the connecting point between the first switching element M1 and the second switching element M2 becomes near to the reference potential (zero V) when the gate voltage g2 of the second switching element M2 enters the high level "H".

The second switching element M2 in this embodiment functions also as the third switching element M4 in the embodiment shown in FIG. 9. An element size of the second switching element M2 of this embodiment is larger than that of the third switching element M4.

Accordingly, in this embodiment, a loss of the period when both of the high-side switching element and the low side switching element turn OFF can be reduced by setting the second switching element M2 to satisfy the above formula (2), compared to the embodiment shown in FIG. 9.

During the light load operation 1 shown in FIG. 12B, the second switching element M2 is set to be ON in a certain period in the regeneration and then the gate voltage g2 of the second switching element M2 is set to be the reference potential (low level "L"). If the inductor current IL flows to the load 10, the potential Vx of the connecting point between the first switching element M1 and the second switching element M2 becomes negative, and the second switching element M2 enters the ON state in spite of the low level "L" of the gate voltage g2.

Then, when the inductor current IL gradually flows from the load 10 toward the ground, the potential Vx of the connecting point between the first switching element M1 and the second switching element M2 becomes positive, and the second switching element M2 enters the OFF state because the gate voltage g2 is in the low level. Accordingly, the invalid current flowing from the load 10 to the ground can be cancelled.

During the light load operation 2 shown in FIG. 12C that is lighter than the light load operation 1, the gate voltage g2 of the second switching element M2 is set to be low level "L" in a certain period in the regeneration. Thereby, the potential Vx of the connecting point between the first switching element M1 and the second switching element M2 becomes negative, and the second switching element M2 enters the ON state.

Then, when the inductor current IL gradually flows from the load 10 toward the ground, the potential Vx of the connecting point between the first switching element M1 and the second switching element M2 becomes positive, and the second switching element M2 enters the OFF state. Accordingly, the invalid current trying to flow from the load 10 toward the ground can be cancelled.

During the light load operation 1 in which the current is relatively high even during a usual light load operation, the conduction loss of the second switching element M2 is much, and thereby, the second switching element M2 is set to be in the ON state in the region in which the load current is high.

And, during the light load operation 2 in which the load current is lower, the loss of driving the second switching element M2 is more than the conduction loss of the second switching element M2, and thereby, the operation is performed without setting the second switching element M2 to be in the ON state (without setting the gate voltage g2 to be the threshold voltage or more). Thereby, the conversion efficiency in the low-current region can be improved. As described above, according to this embodiment, the loss of the period when the third switching element M4 turns ON in the embodiment shown in FIG. 9 can be avoided, and by a space of not preparing the third switching element M4, the chip occupation area can be smaller.

As described above, the embodiments of the invention has been described with reference to examples. However, the invention is not limited thereto but various modifications based on a technical ideas of the invention are possible.

The invention claimed is:

1. A semiconductor device comprising:
   a high-side switching element having a first switching element connected between an input voltage line and an inductive load; and
   a low-side switching element having a second switching element and a third switching element that are connected in parallel between the inductive load and a reference voltage line,
   a surge current being discharged through the third switching element to the reference voltage line when a surge is applied to a terminal connected to the inductive load in the low-side switching element, wherein
   the low-side switching element comprises, a semiconductor layer of a first conductivity type, a source layer of a second conductivity type provided on a portion of the semiconductor layer, a drain layer of the second conductivity type provided so as to be separate from the source layer on a portion of the semiconductor layer, a drift layer of the second conductivity type provided to contact the drain layer between the source layer and the drain layer and having lower impurity concentration than that of the drain layer, a first main electrode connected to the drain layer, a second main electrode connected to the source layer, and a gate electrode provided through an insulating film on a surface of the semiconductor layer between the source layer and the drift layer, and L1>L2 being satisfied, where L1 is a length of the drift layer in the second switching element and L2 is a length of the drift layer in the third switching element, and
   the third switching element has lower breakdown voltage than that of the second switching element.

2. The device according to claim 1, wherein the third switching element comprises:
   a main current path connecting the first main electrode and the second main electrode through the drain layer, the drift layer, a channel formed under the gate electrode, and the source layer; and
   a surge current path provided between the first main electrode and the second main electrode in parallel to the main current path and activated by the surge to flow a surge current there through.

3. The device according to claim 2, wherein the surge current flows through a thyristor.

4. The device according to claim 2, wherein the surge current flows through a bipolar transistor.

5. The device according to claim 2, wherein the surge current flows through a diode.

6. The device according to claim 1, wherein the third switching element has lower current driving capability than that of the second switching element in a state of being applied a rated voltage, and a period, when the second switching element is set to be OFF and the third switching element is set to be ON, is provided during a period when a current flows from the inductive load through the low-side switching element to the reference voltage line.

7. The device according to claim 1, further comprising a detection circuit to detect potential of a connecting point between the low-side switching element and the inductive load.

8. The device according to claim 7, wherein when the potential of the connecting point is negative, the third switching element is turned OFF or turned ON-OFF at the same timing as the second switching element.

9. The device according to claim 7, wherein during a period when the potential of the connecting point becomes positive, a period when the second switching element is set to be OFF and the third switching element is set to be ON is provided.

10. The device according to claim 1, wherein the first switching element and the second switching element are not set to be ON simultaneously, and the first switching element and the third switching element are not set to be ON simultaneously.

* * * * *